(12) United States Patent
Ahlqvist et al.

(10) Patent No.: US 10,048,048 B2
(45) Date of Patent: Aug. 14, 2018

(54) ACTIVE BOLT RELEASE ARRANGEMENT

(71) Applicants: Anders Ahlqvist, Vårgårda (SE); Rickard Andersson, Lidkoping (SE)

(72) Inventors: Anders Ahlqvist, Vårgårda (SE); Rickard Andersson, Lidkoping (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 444 days.

(21) Appl. No.: 14/441,952

(22) PCT Filed: Nov. 13, 2012

(86) PCT No.: PCT/SE2012/051239
§ 371 (c)(1),
(2) Date: May 11, 2015

(87) PCT Pub. No.: WO2014/077740
PCT Pub. Date: May 22, 2014

(65) Prior Publication Data
US 2015/0300788 A1    Oct. 22, 2015

(51) Int. Cl.
*F42B 3/00* (2006.01)
*F16B 31/00* (2006.01)
*B62D 21/15* (2006.01)

(52) U.S. Cl.
CPC ............ *F42B 3/006* (2013.01); *F16B 31/005* (2013.01); *B62D 21/152* (2013.01)

(58) Field of Classification Search
CPC ........ F42B 3/006; F15B 15/19; F16B 31/005; F16B 19/02; B62D 21/152; B62D 21/15
See application file for complete search history.

(56) References Cited

U.S. PATENT DOCUMENTS

| | | | |
|---|---|---|---|
| 3,109,216 A | 11/1963 | Brown | |
| 3,405,593 A | 10/1968 | Kriesel | |
| 4,929,135 A | 5/1990 | Delarue et al. | |
| 8,532,881 B2 | 9/2013 | Ostling et al. | |
| 2005/0084364 A1 | 4/2005 | Tuszynski | |
| 2010/0004826 A1 | 1/2010 | Ostling et al. | |
| 2010/0021264 A1 | 1/2010 | Smith et al. | |

FOREIGN PATENT DOCUMENTS

| | | |
|---|---|---|
| EP | 2143962 A1 | 1/2010 |
| WO | WO-2008130245 A1 | 10/2008 |

OTHER PUBLICATIONS

International Search Report for PCT/SE2012/051239, ISA/SE, Stockholm, dated Sep. 20, 2013.

*Primary Examiner* — Benjamin P Lee
(74) *Attorney, Agent, or Firm* — Stephen T. Olson; Harness, Dickey & Pierce, P.L.C.

(57) ABSTRACT

An active bolt release arrangement includes a nut having nut portions adapted for radial movement, a sleeve part encircling the nut and having contact portions in contact with the nut portions in order to prevent the nut portions from radial movement, and a pyrotechnical actuator. The pyrotechnical actuator is adapted for, upon deployment, moving the sleeve part relative to the nut to a released position forming a release space allowing radial movement of the nut portions. The pyrotechnical actuator is arranged for turning, upon deployment, the sleeve part a predetermined rotational distance to the released position, such that radial movement of the nut portions by formation of the release space is allowed, thereby causing release of a bolt connected to the bolt release arrangement.

14 Claims, 5 Drawing Sheets

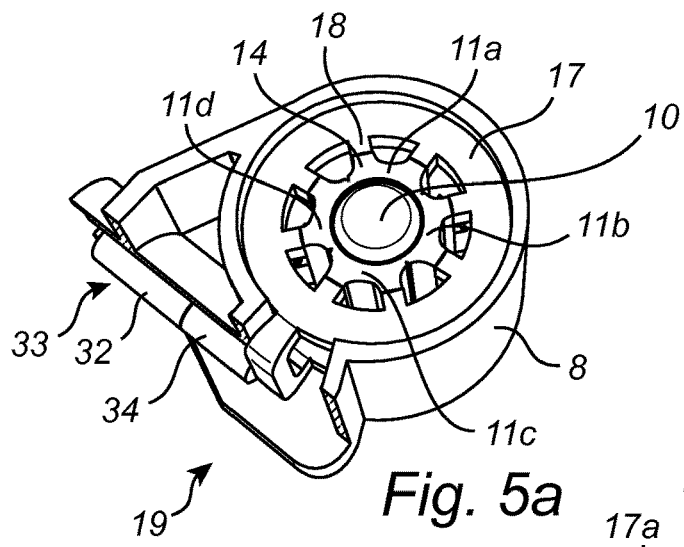
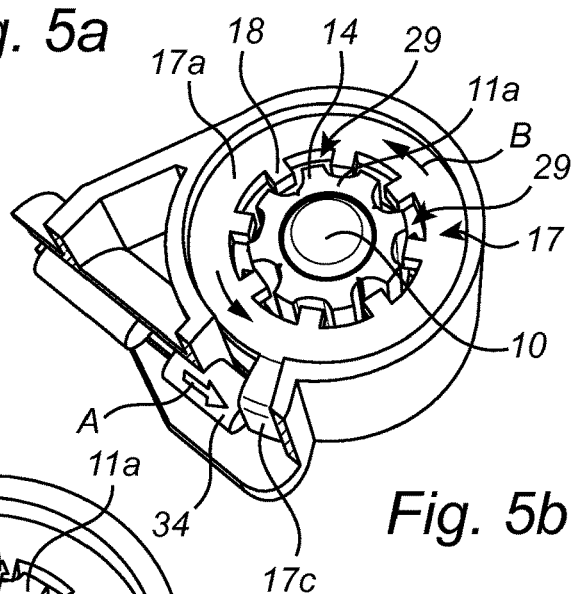
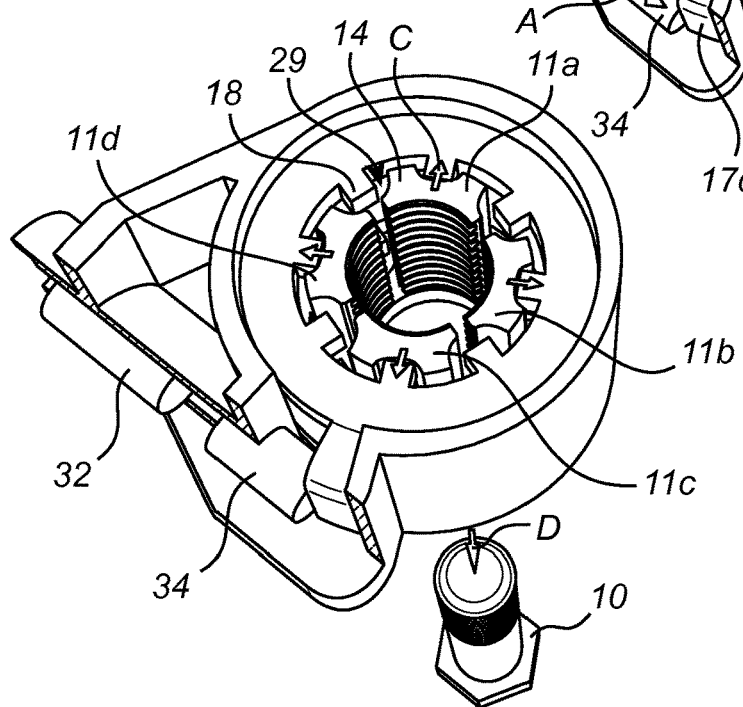
Fig. 5a
Fig. 5b
Fig. 5c

ACTIVE BOLT RELEASE ARRANGEMENT

TECHNICAL FIELD OF THE INVENTION

The present invention relates to an active bolt release arrangement comprising a nut having nut portions adapted for radial movement, a sleeve part encircling the nut and having contact portions in contact with the nut portions in order to prevent the nut portions from radial movement.

BACKGROUND ART

Active bolt assemblies have been used for various applications and are generally responsive to a signal for releasing secured components. An active bolt assembly often includes a pyrotechnical actuator that is actuated to release the components. A typical assembly may include a nut having portions adapted for radial movement. The nut portions are arranged within the assembly to normally retain a bolt. When the actuator is pyrotechnically actuated, the nut portions move outward in response to an axial load on the bolt. As a result, the bolt is released.

US 2010/0021265 discloses an active bolt assembly. The assembly comprises a movable element. In a first position the movable element restrain nut segments from radial expansion. In a second position the nut segments are permitted to radially expand for releasing the bolt assembly.

With respect to previously known solutions, it is desirable to provide a more space-efficient release arrangement.

SUMMARY OF THE INVENTION

It is an object of the present invention to overcome the above described drawback and to provide an improved active bolt release arrangement.

This and other objects that will be apparent from the following summary and description are achieved by an active bolt release arrangement according to the appended claims.

According to an aspect of the present disclosure, there is provided an active bolt release arrangement comprising a nut having nut portions adapted for radial movement, a sleeve part encircling the nut and having contact portions in contact with the nut portions in order to prevent the nut portions from radial movement, a pyrotechnical actuator adapted for, upon deployment, moving the sleeve part relative to the nut to a released position forming a release space allowing radial movement of the nut portions, wherein the pyrotechnical actuator is arranged for turning, upon deployment, the sleeve part a predetermined rotational distance to the released position, such that radial movement of the nut portions by formation of the release space is allowed, thereby causing release of a bolt connected to the bolt release arrangement.

Such an active bolt release arrangement may e.g. be used to release a bolt of an active bolt assembly connecting a structural member of a vehicle to a chassis thereof. As long as the release arrangement is not activated the sleeve part is held in a position in which it secures the connecting function of the nut by restraining the nut portions from radial movement, i.e. by holding the nut in place. The release arrangement is activated, e.g. based on a sensor signal, when there is a need to destroy the coupling function of the active bolt assembly. Upon activation of the active bolt release arrangement the sleeve part element is turned from a position, in which it restrains the nut portions from radial expansion, to a released position, in which it no longer restrains the nut segments from radial expansion. Hence, a space-efficient release arrangement with compact installation height is enabled since no linear movement of the sleeve part is needed to release a bolt connected to the release arrangement. The pyrotechnical actuator provides for a rapid and robust release of a bolt connected to the release arrangement.

According to one embodiment the sleeve part has a turning member for turning the sleeve part to the released position.

According to one embodiment the arrangement comprises a housing surrounding the sleeve part and having an inner surface which serves as a stop surface for the turning member in the released position. The stop surface thus defines the predetermined rotational distance that the sleeve part need to be turned for forming the release space.

According to one embodiment the pyrotechnical actuator comprises a piston arranged to, upon deployment of the actuator, exert a force on the sleeve part, thereby turning the sleeve part to the released position.

The release arrangement may comprise a lid covering the nut and the sleeve part.

According to one embodiment the sleeve part comprises two parallel rings and is of the form of a clam shell with the turning member connecting the two rings.

According to one embodiment the nut has weakened sections along a longitudinal axis. Adjacent nut portions may thus be interconnected at fracture lines, thereby forming a frangible nut.

According to one embodiment each of the outer periphery of the nut and the inner periphery of the sleeve part is cogwheel shaped to allow formation of the release space.

According to one embodiment the pyrotechnical actuator comprises an actuator housing and a piston integrated in a single piece. This embodiment has the advantage that pressurized gas generated by the pytotechnical actuator during deployment may be retained within the actuator. A gas-tight release arrangement may thus be provided.

According to one embodiment the housing has at least one inwardly extending protrusion which is arranged to prevent the nut from being rotated with respect to the housing. The inwardly extending protrusion, which may be in the form of a cog or a tooth, thus prevents rotation of the nut during screwing and unscrewing of the bolt, thereby facilitating connection of a bolt to the release arrangement.

The pyrotechnical actuator may be adapted to receive an ignition signal from a sensor system, such as an in-crash based sensor system or a pre-crash based sensor system.

The release arrangement may be arranged in a motor vehicle for releasing an active bolt assembly releasably connecting a structural member of the vehicle to the vehicle chassis.

According to another aspect of the present disclosure, there is provided a method of releasing a bolt of an active bolt assembly, which active bolt assembly comprises a nut having nut portions adapted for radial movement, the bolt having one end coupled to the nut, and a sleeve part encircling the nut and having contact portions in contact with the nut portions in order to prevent the nut portions from radial movement, wherein the method comprises turning the sleeve part a predetermined rotational distance to a released position, such that a release space allowing radial movement of the nut portions is formed, thereby releasing the bolt from the nut.

These and other aspects of the invention will be apparent from and elucidated with reference to the claims and the embodiments described hereinafter.

BRIEF DESCRIPTION OF THE DRAWINGS

The invention will hereafter be described in more detail and with reference to the appended schematic drawings.

FIGS. 5a-c are schematic perspective views illustrating the function of the release arrangement shown in FIGS. 3 and 4.

DETAILED DESCRIPTION OF PREFERRED EMBODIMENTS OF THE INVENTION

Figure 1:
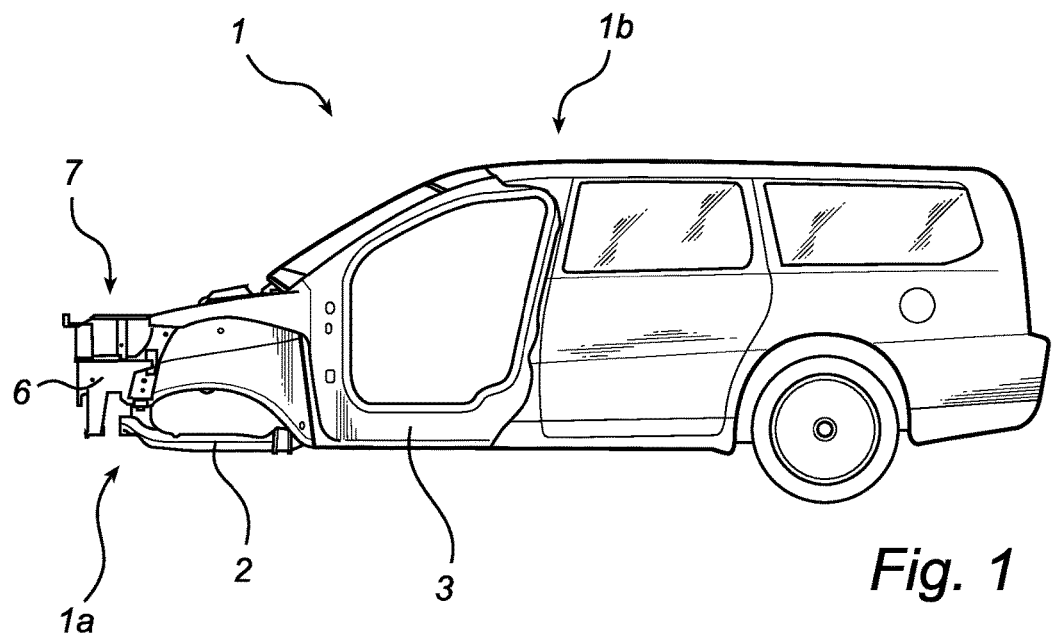
FIG. 1 is a side view of a part of motor vehicle structure.

FIG. 1 shows parts of a vehicle structure 1 which comprises a front subframe 2 and a chassis 3. An active bolt assembly may be arranged for releasably connecting the rear end of the front subframe 2 to the chassis 3. The front subframe 2, which comprises longitudinally and transversally extending structural members, is an important member of the vehicle front end structure 1a. The front end vehicle structure 1a further comprises collapsible longitudinal structural members 6 that are adapted to form a deformation zone 7 in which collision energy is absorbed during an impact event, such as in a collision with another vehicle or an object. Due to the deformation zone 7 the acceleration experienced by an occupant inside the passenger compartment 1b during an impact event is reduced. Consequently, the risk of injuries to the occupant(s) is reduced. In optimizing the stiffness of the front end structure 1a different load cases are considered.

Figure 2:
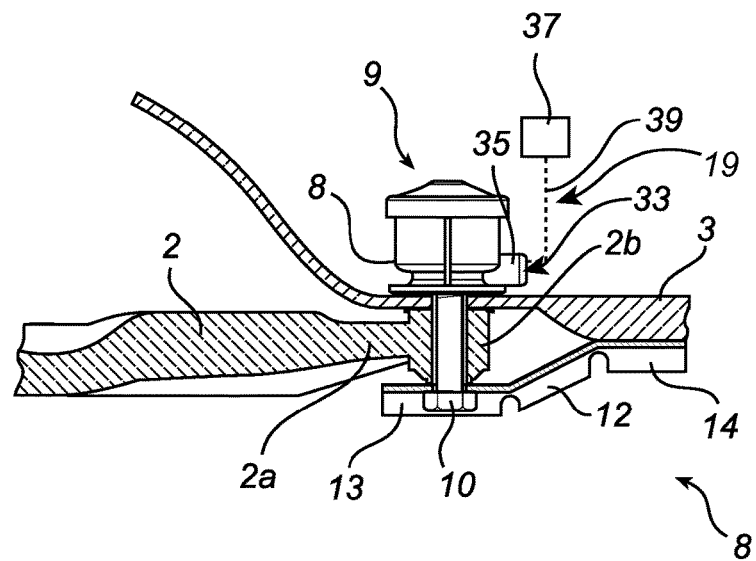
FIG. 2 is a schematic cross sectional view illustrating an active bolt assembly.
Figure 3:
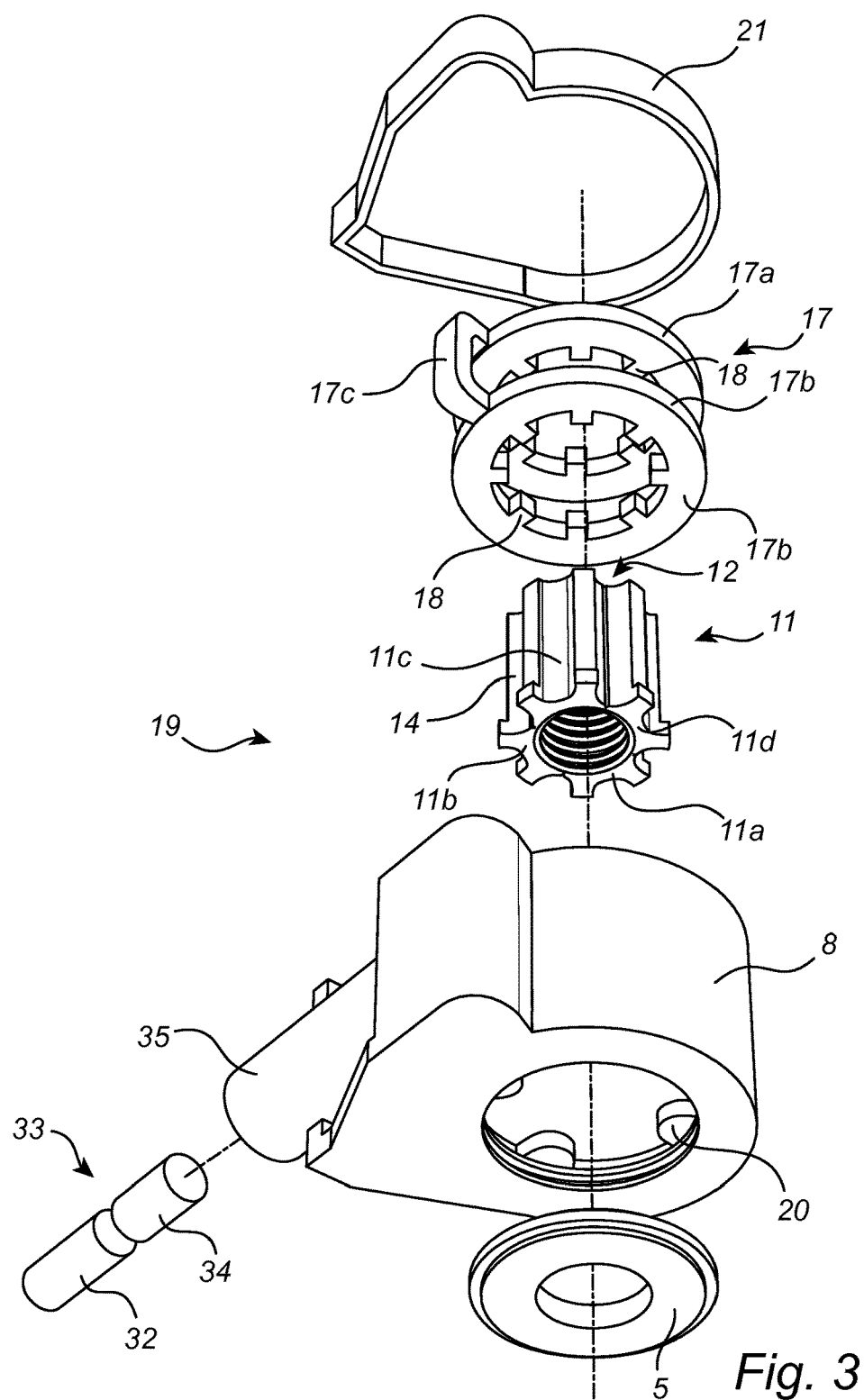
FIG. 3 is a schematic perspective exploded view illustrating parts of an active bolt release arrangement according to an embodiment of the present disclosure.

FIG. 2 shows schematically a portion of a vehicle front subframe 2 of which a rear end 2a is connected to a vehicle chassis 3 by means of an active bolt assembly 9. The active bolt assembly 9 comprises a housing 8, a threaded bolt 10 and a nut 11, which is illustrated in FIG. 3, having internal threads. The nut 11 is disposed in a cavity of the housing 8, as will be described hereinafter. The bolt 10 extends through a sleeve 2b formed at the rear end 2a of the front subframe 2 and through an aperture in the chassis 3, and is threadably engaged with the nut 11. An active bolt release arrangement 19 according to an embodiment of the present disclosure is arranged for releasing the bolt 10 of the active bolt assembly 9, as will be described in detail hereinafter.

The active bolt assembly 9 further comprises a pivotable means, in the form of a lever arm 12, which at a front end 13 thereof is mounted to the rear end 2a of the front subframe 2 and at a rear end 14 thereof is mounted to the chassis 3, for assisting release of the bolt 10 from the chassis 3 when the connecting function of the bolt assembly 9 is destroyed, i.e. when the bolt 10 is released. The housing 8 is attached to the vehicle chassis 3 by means of bolt connections where bolts (not shown) are extending through holes in a bottom flange of the housing 8.

It is understood that in a crash situation it may be required to rapidly release the bolt 10. To this end, the active bolt release arrangement 19 comprises a pyrotechnical actuator 33. The connection between the rear end 2a of the front subframe 2 and the chassis 3 established by the active bolt assembly 9 may thus be rapidly released.

Now referring to FIG. 3 the active bolt assembly 9 and the active bolt release arrangement 19 will be further described. FIG. 3 is an exploded perspective view schematically illustrating parts of the active bolt assembly 9 and the release arrangement 19. The active bolt assembly 9 comprises a washer 5, the housing 8, a nut 11, a sleeve part 17, the pyrotechnical actuator 33 and a lid 21. The active bolt release arrangement 19 comprises the nut 11, the sleeve part 17 and the pyrotechnical actuator 33.

Figure 6A:
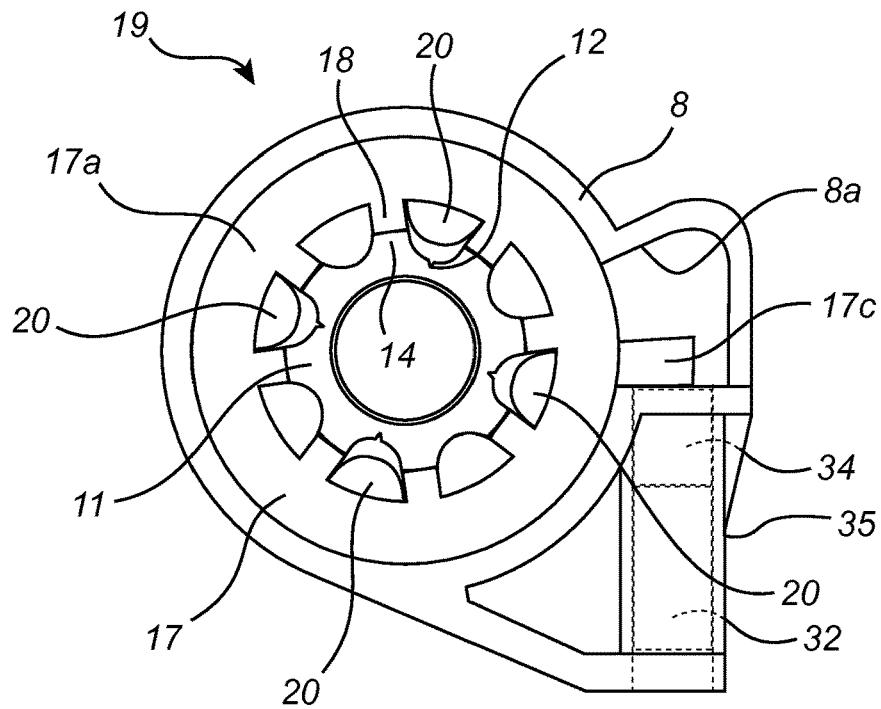
FIGS. 6a-b are schematic top views further illustrating the function of the release arrangement shown in FIGS. 3 and 4.

The nut 11 is adapted for radial movement. To this end, the nut 11 may include a plurality of nut portions connected to one another through fracture lines, i.e. weakened sections, such that the nut 11 is a frangible nut. For other applications within the scope of the present teachings, however, the plurality of portions may alternatively be a plurality of discrete portions. In this embodiment the nut 11 includes four nut portions 11a, 11b, 11c, 11d, as best illustrated in FIG. 6a. Adjacent nut portions of the nut 11 are interconnected at fracture lines 12 and the nut portions 11a, 11b, 11c, 11d together form a frangible nut 11. The frangible nut 11 may be manufactured from a powdered metal process. The powdered metal process may yield a nut 11 having high compression strength an low elongation values, resulting in a component having brittle characteristics. Alternatively, the nut 11 may be manufactured with any other suitable material capable of functioning as described herein.

The nut 11 has on its outer periphery several teeth 14, in this case eight teeth, forming contact portions. The nut 11 is thus cogwheel shaped.

The sleeve part 17 encircles the nut 11 and is adapted to prevent the nut portions 11a, 11b, 11c, 11d from radial movement. To this end the sleeve part 17 has on its inner periphery several contact portions, in the form of teeth 18, forming a cogweel-shape. The sleeve part 17 is movable to a released position, illustrated in FIGS. 5a-b and 6a, in which radial movement of the nut portions 11a, 11b, 11c, 11d is allowed, as will be described in detail hereinafter referring to FIGS. 5a-c.

In this embodiment the sleeve part 17 comprises two parallel rings 17a, 17b connected to each other by a C-shaped element 17c. The two rings 17a, 17b and the connection element 17c are integrally formed. The C-shaped element 17c forms a turning member for turning the sleeve part 17 relative to the nut 11. Each of the two sleeve part rings 17a, 17b has a cogwheel shaped inner periphery with eight teeth 18. Alternatively, the sleeve part 17 may be formed from one single sleeve-shaped element provided with a turning member, e.g. by means of extrusion.

The housing 8 has a receiving portion 35 for receiving the pyrotechnical actuator 33. Furthermore, the housing 8 has four inwardly extending protrusions 20, in the form of cogs, of which three are visible in FIG. 3, which prevent the nut 11 from being rotated with respect to the housing 8, e.g. when the bolt 10 of the active bolt assembly 9 is tightened.

As discussed hereinbefore it may be required to rapidly release the bolt 10 from the nut 11. Therefore, a pyrotechnical actuator 33 is used. The pyrotechnical actuator 33 enables a rapid turning of the sleeve part 17 relative to the nut 11 to the released position in order to rapidly release the connection established by the bolt joint system formed by the bolt 10 and the nut 11. The pyrotechnical actuator 33 comprises an actuator housing 32 and an initiator device (not shown), in the form of a pyrotechnical squib, of a type known in the art. The pyrotechnical squib, which is accommodated in the actuator housing 32, comprises a pyrotechnical charge and an electrical igniter. The pyrotechnical actuator 33 is connected to a control unit 37 by means of a cable 39, as schematically illustrated in FIG. 2. The electrical igniter may be activated by a signal from the control unit 37. Upon activation of the electrical igniter the pyrotechnical charge generates pressurized gas.

The pyrotechnical actuator 33 is arranged to, upon deployment, turn the sleeve part 17 to the released position. To this end the pyrotechnical charge is adapted to generate sufficient pressurized gas to move the turning member 17c of the sleeve part 17, such that the sleeve part 17 is turned a predetermined rotational distance $R_1$ from a first position, illustrated in FIG. 6a, to the released position, illustrated in FIG. 6b.

In this embodiment the pyrotechnical actuator 33 comprises a piston 34. The piston 34 is a single-acting piston, meaning the piston 34 is extended only in one direction. The squib 32 and the piston 34 are received in the receiving portion 35 of the housing 8, as illustrated in FIG. 6a. The actuator piston 34 is arranged to, upon deployment of the actuator 33, move the turning member 17c of the sleeve part 17, thereby turning the sleeve part 17 to the released position. Upon ignition of the squib a pressure force, which acts to push the actuator piston 34 in a direction away from the actuator housing 32, is generated. The pyrotechnical charge of the squib is adapted to generate sufficient pressurized gas to extend the piston 34 through a stroke of desirable length, thereby turning the sleeve part 17 to the released position.

The active bolt assembly 9 further comprises a lid 21, in the form of a plastic lid. The lid 21, which may be formed from a thermoplastic elastomer, protects the release arrangement 19 from e.g. water.

Figure 4:
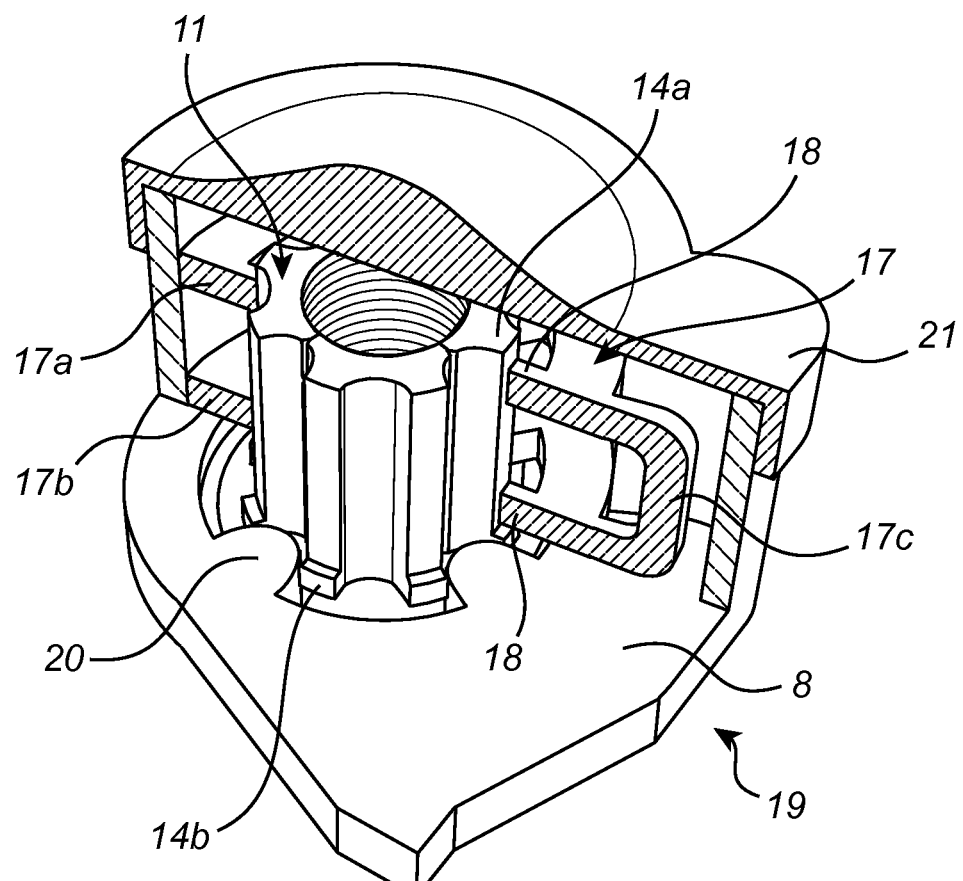
FIG. 4 is a schematic partly sectioned view of the release arrangement shown in FIG. 3.

Now referring to FIG. 4 the active bolt assembly 9 and the release arrangement 19 will be further described. FIG. 4 is a perspective partly sectioned view schematically illustrating the bolt release arrangement 19 when the nut portions 11a, 11b, 11c, 11d are prevented from radial movement by the sleeve part 17. Then, each of the sleeve part contact portions, i.e. the sleeve part teeth 18, is in contact with a corresponding nut contact portion, i.e. a nut teeth 14, thereby preventing the nut portions 11a, 11b, 11c, 11d from radial movement. The sleeve part 17 is thus configured to hold the nut 11 in place to secure the function thereof until release of a bolt 10 coupled to the nut 11 is desired. The sleeve part 17 is movable to the released position, in which radial movement of the nut portions 11a, 11b, 11c, 11d is allowed, as will described hereinafter.

As illustrated in FIG. 4 parts 14b of some of the nut teeth 14 cooperates with the cogs 20 of the housing 8 to lock the nut 11 against rotation relative to the housing 8. Hence, rotation of the nut 11 relative to the housing 8, e.g. during tightening of the bolt 10, is prevented by the cogs 20 of the housing 8.

Upon assembly of the active bolt assembly 9, a base of the housing 8 reacts the torque of the nut 11 and bolt 10. A low level of torque may be introduced during assembly to fracture the nut 11. In this manner, the nut 11 may be pre-broken prior to activation of the release arrangement 19. Alternatively, the nut 11 may be fractured during activation the release arrangement 19.

Now referring to FIGS. 5a-5c, the function of the active bolt release arrangement 19 will be described.

FIG. 5a illustrates the active bolt release arrangement 19 when the nut portions 11a, 11b, 11c, 11d are prevented from radial movement by the sleeve part 17.

Upon deployment of the pyrotechnic actuator 33 a force is applied on the turning member 17c by the actuator piston 34, as illustrated by the arrow A in FIG. 5b. Due to the force acting on the turning member 17c the sleeve part 17 is turned, as illustrated by the arrows B in FIG. 5b. The sleeve part 17 is turned a predetermined rotational distance to a released position, illustrated in FIG. 5b, thereby forming a release space 29 allowing radial movement of the nut portions 11a, 11b, 11c, 11d. In the released position the contact portions 18 of the sleeve part 17 are no longer in contact with the teeth 14 of the nut portions 11a, 11b, 11c, 11d. At this stage the bolt 10 is subjected to forces in its longitudinal direction due to crash forces. As a result the nut portions 11a, 11b, 11c, 11d are then separated from each other and from the bolt 10 by forces from the bolt 10, as illustrated by arrows C in FIG. 4c. Consequently, the connecting function of nut 11 is destroyed which enables displacement of the bolt 10, as illustrated by the arrow D in FIG. 5c, and thereby displacement of the rear end 2a of the front subframe 2 relative to the vehicle chassis 3.

Figure 6B:
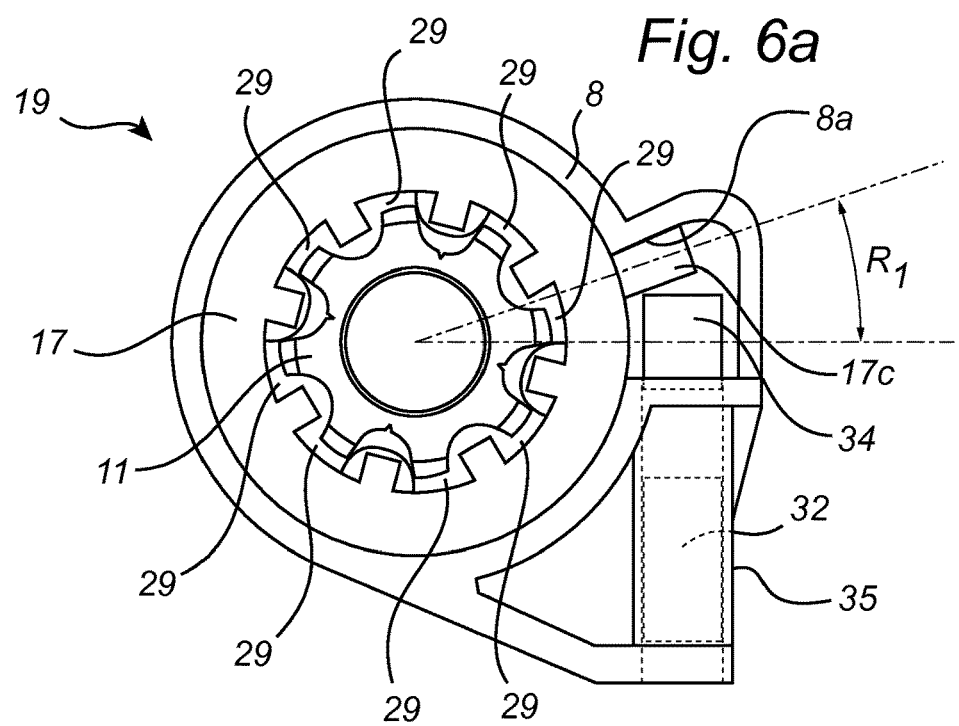

Now referring to FIGS. 6a-b, the function of the active bolt release arrangement 19 will be further described. As illustrated in FIG. 6a the nut 11 is prevented from rotation relative to the housing 8 by the inwardly extending protrusions 20 of the housing 8. A bolt may thus be coupled to the nut 11.

FIG. 6b illustrates the active bolt release arrangement 19 in the released position. In the released position the turning member 17c abuts against an inner surface 8a of the housing 8. The inner surface 8a thus forms a stop surface which limits the rotation of the sleeve part 17, such that the sleeve part 17 is turned a predetermined distance $R_1$, illustrated in FIG. 6b, to the released position by the piston 34.

It is realized by a person skilled in the art that features from various embodiments disclosed herein may be combined with one another in order to provide further alternative embodiments.

Hereinbefore, it has been described that the pyrotechnical actuator 33 comprises a actuator housing 32 and a separate piston 34. It is appreciated that the actuator housing 32 and the piston 34 may be integrated in a single piece. Pressurized gas generated by the pyrotechnical actuator during deployment is kept with in the actuator housing. A gas-tight release arrangement may thus be provided.

The pyrotechnical actuator may e.g. be of a type similar to one of the linear actuators described in EP 1 532 370.

Hereinbefore, it has been described that the pyrotechnical actuator 33 comprises a piston arranged to move the turning member 17c of the sleeve part 17. The piston 34 is thus moved by pressurized gas generated by the pyrotechnical actuator. It is appreciated that the sleeve part 17 and the pyrotechnical actuator 33 may be arranged such that the pressurized gas itself turns the sleeve part 17 through a pressure force acting on the turning member 17c.

The invention claimed is:

1. An active bolt release arrangement comprising
a nut having nut portions adapted for radial movement;
a sleeve part encircling the nut and having contact portions in contact with the nut portions in order to prevent the nut portions from radial movement;
a pyrotechnical actuator adapted for, upon deployment, moving the sleeve part relative to the nut to a released position forming a release space allowing radial movement of the nut portions, the pyrotechnical actuator arranged for turning, upon deployment, the sleeve part a predetermined rotational distance to the released position, such that radial movement of the nut portions by formation of the release space is allowed, thereby causing release of a bolt connected to the bolt release arrangement; and a housing surrounding the sleeve part, the housing having at least one inwardly extending protrusion arranged to prevent the nut from being rotated with respect to the housing;

wherein the at least one inwardly extending protrusion includes a plurality of cogs which cooperate with teeth on the nut to prevent rotation of the nut relative to the housing during tightening of the bolt.

2. The active bolt release arrangement according to claim 1, wherein the sleeve part has a turning member for turning the sleeve part to the released position.

3. The active bolt release arrangement according to claim 2, wherein the housing has an inner surface which serves as a stop surface for the turning member in the released position.

4. The active bolt release arrangement according to claim 2, wherein the sleeve part comprises two parallel rings and is of the form of a clam shell with the turning member connecting the two rings.

5. The active bolt release arrangement according to claim 1, wherein the pyrotechnical actuator comprises a piston arranged to, upon deployment of the actuator, exert a force on the sleeve part, thereby turning the sleeve part to the released position.

6. The active bolt release arrangement according to claim 1, further comprising a lid covering the nut and the sleeve part.

7. The active bolt release arrangement according to claim 1, wherein the nut has weakened sections along a longitudinal axis.

8. The active bolt release arrangement according to claim 1, wherein each of an outer periphery of the nut and an inner periphery of the sleeve part is cogwheel shaped to allow formation of the release space.

9. The active bolt release arrangement according to claim 1, wherein adjacent nut portions are interconnected at fracture, thereby forming a frangible nut.

10. An active bolt release arrangement comprising:
a nut having nut portions adapted for radial movement;
a sleeve part encircling the nut and having contact portions in contact with the nut portions in order to prevent the nut portions from radial movement;
a pyrotechnical actuator adapted for, upon deployment, moving the sleeve part relative to the nut to a released position forming a release space allowing radial movement of the nut portions, the pyrotechnical actuator arranged for turning, upon deployment, the sleeve part a predetermined rotational distance to the released position, such that radial movement of the nut portions by formation of the release space is allowed, thereby causing release of a bolt connected to the bolt release arrangement,
wherein the sleeve part comprises two parallel rings and is in the form of a clam shell.

11. The active bolt release arrangement according to claim 10, wherein the sleeve part has a turning member for turning the sleeve part to the released position.

12. The active bolt release arrangement according to claim 11, wherein the turning member connects the two rings.

13. The active bolt release arrangement according to claim 1, wherein the housing includes a plurality of inwardly extending protrusions.

14. An active bolt release arrangement comprising
a nut having nut portions adapted for radial movement;
a sleeve part encircling the nut and having contact portions in contact with the nut portions in order to prevent the nut portions from radial movement;
a pyrotechnical actuator adapted for, upon deployment, moving the sleeve part relative to the nut to a released position forming a release space allowing radial movement of the nut portions, the pyrotechnical actuator arranged for turning, upon deployment, the sleeve part a predetermined rotational distance to the released position, such that radial movement of the nut portions by formation of the release space is allowed, thereby causing release of a bolt connected to the bolt release arrangement,
wherein the sleeve part has a turning member for turning the sleeve part to the released position, and
wherein the sleeve part comprises two parallel rings and is of the form of a clam shell with the turning member connecting the two rings.

\* \* \* \* \*